(No Model.)
O. B. SHALLENBERGER.
METER FOR ALTERNATING ELECTRIC CURRENTS.
No. 448,676. Patented Mar. 24, 1891.
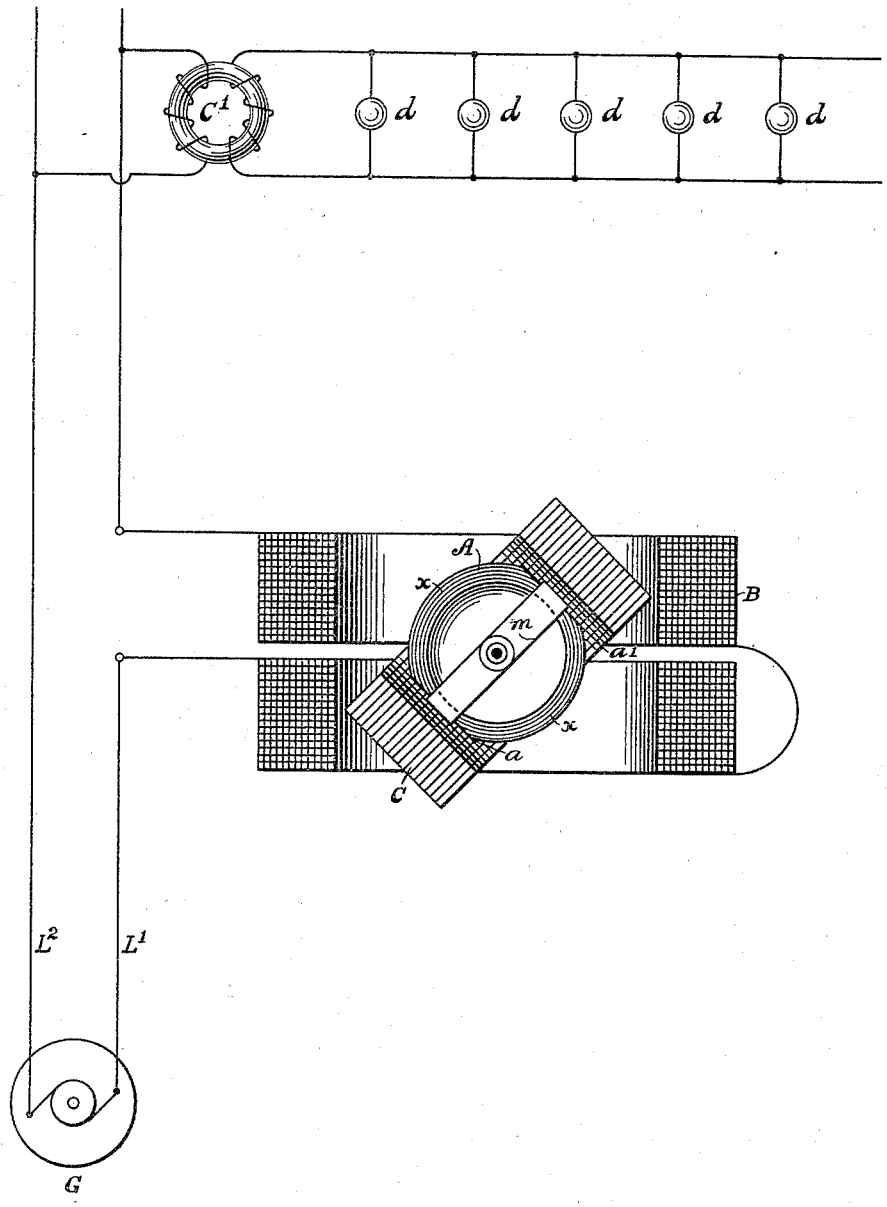
Witnesses
James W. Smith.
Edward W. Kelly
Inventor
Oliver B. Shallenberger
By his Attorney
Charles A. Terry.

UNITED STATES PATENT OFFICE.

OLIVER B. SHALLENBERGER, OF ROCHESTER, ASSIGNOR, BY MESNE ASSIGNMENTS, TO THE WESTINGHOUSE ELECTRIC AND MANUFACTURING COMPANY, OF PITTSBURG, PENNSYLVANIA.

METER FOR ALTERNATING ELECTRIC CURRENTS.

SPECIFICATION forming part of Letters Patent No. 448,676, dated March 24, 1891.

Application filed March 13, 1890. Serial No. 343,704. (No model.)

*To all whom it may concern:*

Be it known that I, OLIVER B. SHALLENBERGER, a citizen of the United States, residing in Rochester, in the county of Beaver and State of Pennsylvania, have invented a certain new and useful Improvement in Meters for Alternating Electric Currents, (Case No. 255,) of which the following is a specification.

The invention relates to certain improvements in the construction of apparatus for measuring the electric currents consumed in doing useful work in an alternating-current circuit.

The object of the invention is to provide means whereby a meter of the general character described in certain Letters Patent issued to me on the 14th day of August, 1888, Nos. 388,003 and 388,004, may be employed for measuring only the current consumed in doing useful work, while it is not operated by the leakage-current, or such current as may flow when no work is being done. Such apparatus is of special utility in connection with a circuit employing electric converters or transformers, for the reason that there is practically more or less leakage through the primary coils of the converters even when no work is being done in their secondary circuits, and therefore a meter placed in the primary circuit is subjected to a continual flow of current, which would cause the meter to register unless provision were made to the contrary.

My invention consists in constructing a meter so that the armature will require a certain value of current to set it in operation by reason of a dead-point being formed in the armature. A current of the value which will leak through the circuit when no work is being done will be insufficient to overcome this dead-point; but when the increase of current required to operate the translating devices flows then the armature responds and the meter will record.

The accompanying drawing illustrates a method of carrying the invention into effect.

Referring to the figure, G represents any suitable source of alternating, intermittent, or pulsatory electric currents, and $L'$ $L^2$ conductors leading therefrom to the work-circuit. In this work-circuit any required number of converters or transformers are connected, as shown at $C'$. The primary coils are connected in the main circuits $L'$ $L^2$, and the secondary coils supply translating devices—such, for instance, as incandescent electric lamps, as shown at $d$.

More or less current will leak through the primary coils of the converters even when their secondary circuits are open. This current is usually termed "leakage-current." The percentage of current thus consumed is small; but it becomes appreciable in amount when several converters are connected in parallel. It is evident that if a consumer pays for current by reference to a meter it would not be proper to record upon the meter the current thus consumed, but only that used in doing useful work. To avoid this the meter is constructed so that it will respond only when this leakage-current is exceeded, or, in other words, only when current is allowed to flow through the translating devices.

The invention is applicable to other forms of meters than that described in the patents referred to; but it is particularly adapted to that form. The plan whereby, according to the present invention, this result is secured consists in constructing the armature A so that when at rest it has a tendency to stand in a given position with reference to the coil or circuit C, which is closed upon itself and which stands at an angle with reference to the coil B, the coil B being connected in the primary circuit $L'$. While the armature stands in this position it requires a predetermined initial current to set it in motion. The inertia being once overcome, the armature will continue to revolve with increasing rapidity as the current increases. To accomplish this the armature is cut away on two sides, as shown at $a$ $a'$, so that the diameter is greater in the direction $x$ $x$. The armature will then stand in the position shown in the drawing so long as the current flowing is insufficient to overcome the tendency of the armature to set itself in this position. This tendency may be augmented by placing a copper band $m$ around the armature in such direction that the polar line established by the induced currents circulating in it will be in the direction $x$ $x$. The effect of this is to lessen the torque exerted upon the armature so long as it stands in the position shown in the drawing; but when once set in revolution it will continue to revolve readily under the influence of the current flowing.

In another application, Serial No. 294,568, filed by me February 5, 1889, there is described among other forms of meters that herein shown, and claim is made upon the broad method of operation.

I claim as my invention—

1. The combination, with an alternating-current electric circuit, of a meter having a primary coil, a secondary coil placed at an angle therewith, and a rotating armature acted upon by the inductive influence of the currents traversing said coils, said armature having dead-points, substantially as described.

2. In an electric meter for alternating currents, an armature constructed with dead-points, substantially as described.

3. In an electric meter for alternating currents, a primary inducing-coil, a secondary coil placed at an angle therewith, and an armature in the inductive field of both of said coils, circular in form, but flattened at one or more points, substantially as described.

4. The combination, in an electric meter for alternating electric currents having a primary inducing-coil, a secondary coil at an angle therewith, and an armature in inductive relation to both of said coils, of an independent band of conducting material surrounding said armature.

In testimony whereof I have hereunto subscribed my name this 28th day of February, A. D. 1890.

OLIVER B. SHALLENBERGER.

Witnesses:
S. R. ROSEMAND,
J. W. SMITH.